United States Patent

[11] 3,619,231

| [72] | Inventor | William B. Johnson<br>Chester, N.J. |
|---|---|---|
| [21] | Appl. No. | 845,926 |
| [22] | Filed | June 16, 1969 |
| [45] | Patented | Nov. 9, 1971 |
| [73] | Assignee | Anchor Post Products, Inc.<br>Baltimore, Md.<br>Continuation of application Ser. No.<br>496,458, Oct. 15, 1965, now abandoned. |

[54] CONTINUOUS METAL COATING PROCESS WITH FUSIBLE PULVERULENT MATERIALS
7 Claims, 2 Drawing Figs.

[52] U.S. Cl. .................................................. 117/21,
117/128.4, 118/67, 118/69, 118/405
[51] Int. Cl. ............................................. B44d 1/092,
B44d 1/094, B44d 1/42
[50] Field of Search...................................... 117/21,
218, 232, 128.4, 18; 118/405, 67, 69

[56] References Cited
UNITED STATES PATENTS

| 2,341,732 | 2/1944 | Marvin | 117/22 X |
|---|---|---|---|
| 2,844,489 | 7/1958 | Gemmer | 117/21 X |
| 2,866,718 | 12/1958 | Guzzetta | 117/21 |
| 2,987,413 | 6/1961 | Dettling et al. | 117/21 |
| 2,995,482 | 8/1961 | Boyce | 117/21 X |
| 3,008,848 | 11/1961 | Annonio | 117/21 X |
| 3,016,875 | 1/1962 | Ballentine et al. | 117/21 X |
| 3,019,126 | 1/1962 | Bartholomew | 117/21 X |
| 3,043,710 | 7/1962 | Busse et al. | 117/132 |
| 3,044,899 | 7/1962 | Canterino | 117/132 |
| 3,136,651 | 6/1964 | Spessard | 117/21 |
| 3,140,195 | 7/1964 | Nagel | 117/18 X |
| 3,145,127 | 8/1964 | Baun | 117/21 X |
| 3,194,675 | 7/1965 | Carter | 117/29 X |
| 3,197,324 | 7/1965 | Brooks | 117/21 |
| 3,242,131 | 3/1966 | Peerman | 117/21 X |
| 3,264,131 | 8/1966 | Nagel | 117/21 |
| 3,282,249 | 11/1966 | Ramsay | 117/21 X |
| 3,348,995 | 10/1967 | Baker et al. | 117/21 X |
| 3,410,709 | 11/1968 | Meyer et al. | 117/21 |

FOREIGN PATENTS

| 251,882 | 5/1964 | Australia | 117/21 |
|---|---|---|---|
| 993,566 | 5/1965 | Great Britain | 117/21 |

Primary Examiner—William D. Martin
Assistant Examiner—Edward J. Cabic
Attorney—Walter G. Finch

ABSTRACT: A method and apparatus for the coating of running strands on webs with a thermoplastic protective layer. The successive steps comprise the application of a primer and the air current drying and curing of same using inductive heating. While still hot, the strand or web is passed axially through a dense cylindrical bed of a powdered thermoplastic. This bed is constantly being cooled and replenished by recycling using air currents and directional jets. Vinyl polymer, epoxy-polyamide, and polyolefins such as polyethylene or polypropylene containing metals, metal oxides, metal hydroxides and metal carboxyl groups are proposed as coating materials.

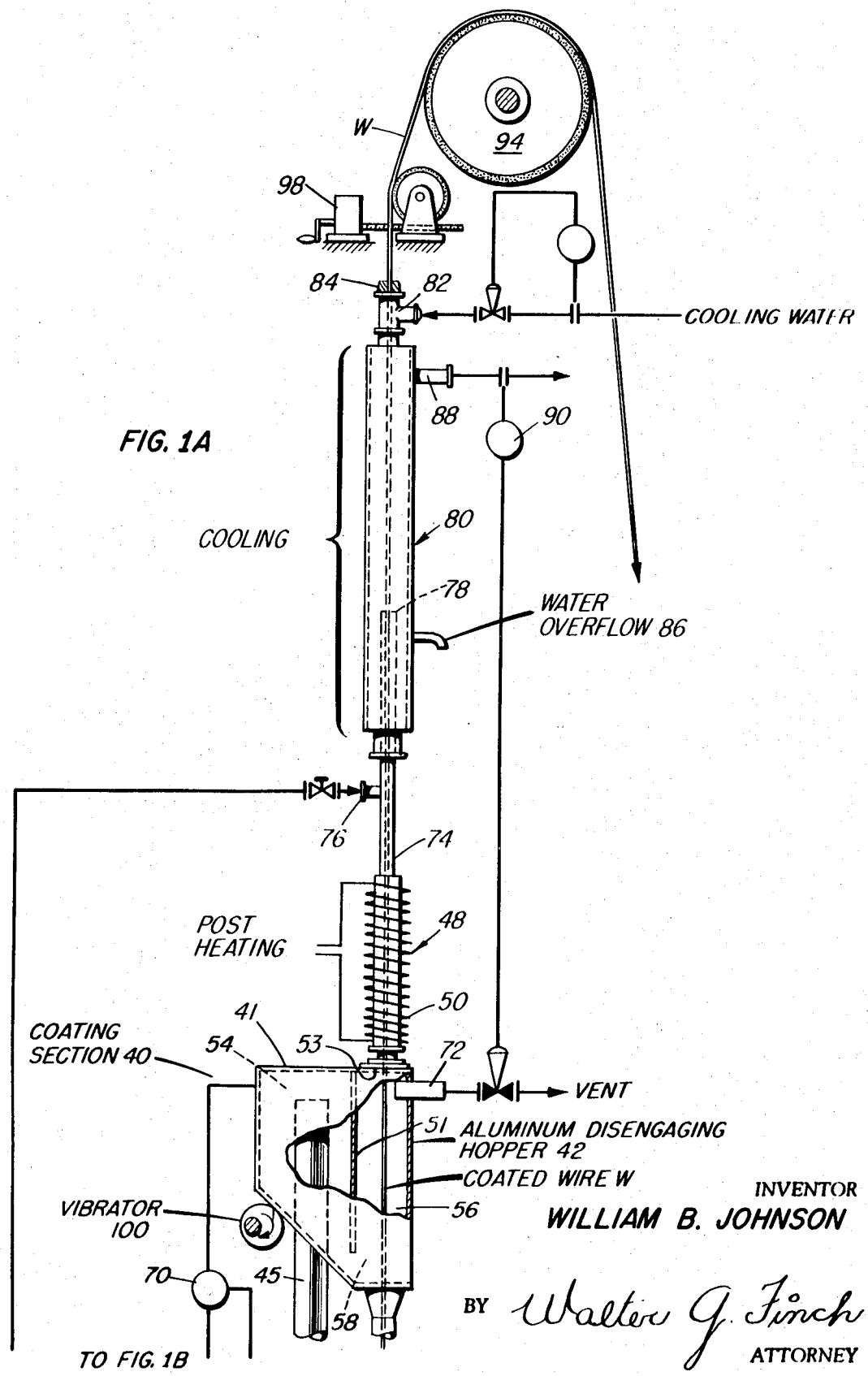

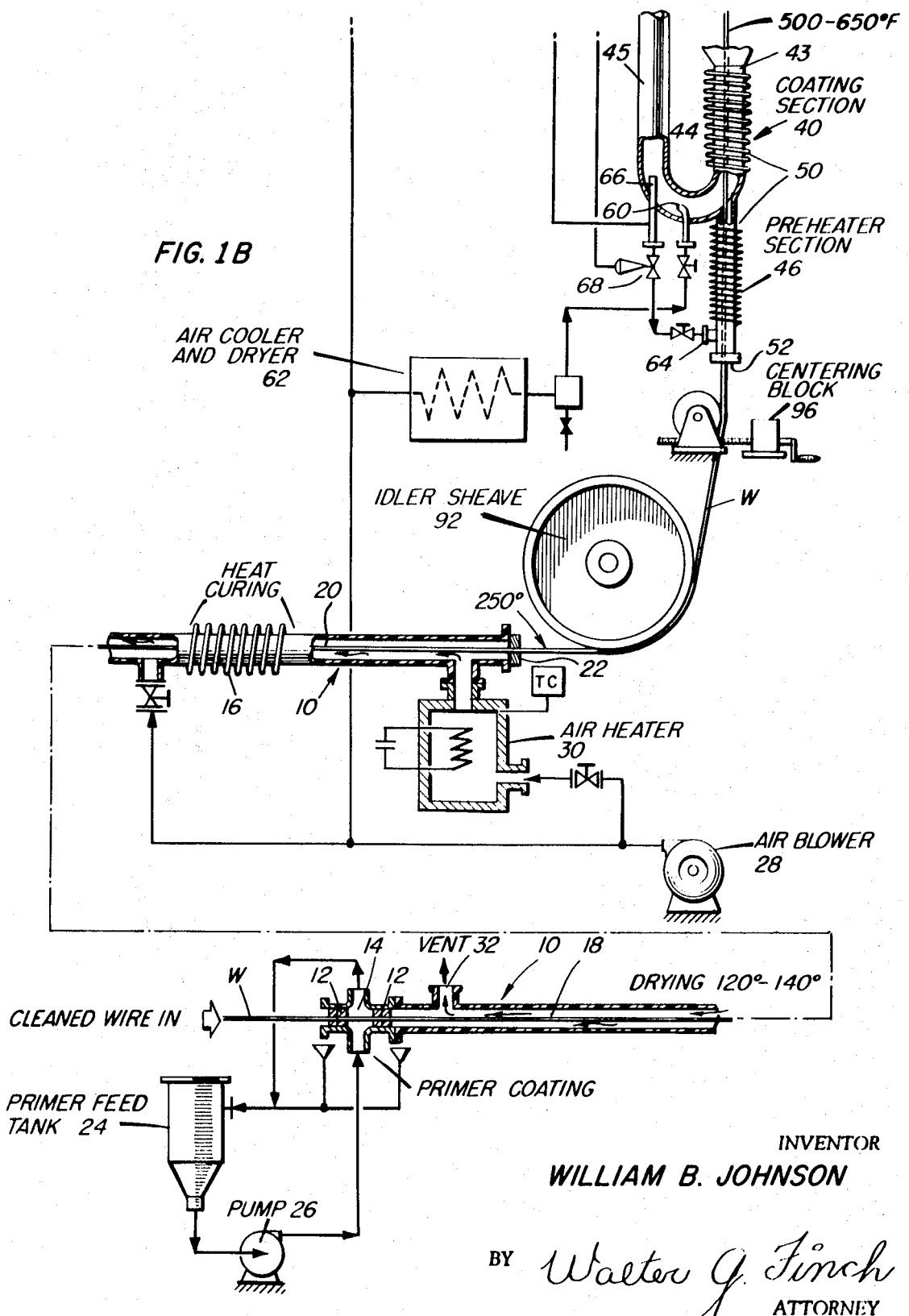

CONTINUOUS METAL COATING PROCESS WITH FUSIBLE PULVERULENT MATERIALS

This invention relates generally to the manufacture of coated articles, and more particularly it pertains to a technique and apparatus for applying nonporous plastic films to wire in a continuous process.

This patent application is a continuation of U.S. Pat. application Ser. No. 496,458, filed by Applicant on Oct. 15, 1965 for "continuous Metal Coating Process with Fusible Pulverulent Materials," now abandoned.

Metallic platings have long been used for weather proofing wire. However, a metallic coat of this nature does not always survive the bending and forming operations during subsequent weathering as for fence fabric.

It is an object of this invention, therefore to provide a process for forming and bonding a tough coat of plastic to wire for a more durable element for fencing.

Other objects of this invention are to provide a continuous metal coating process with fusible pulverulent materials and products formed thereby, which is economical, efficient and reliable, and which has many advantages over prior art processes and products.

Other objects and attendant advantages of this invention will become more readily apparent and understood from the following detailed specification and accompanying drawings in which:

FIG. 1A is a schematic depiction of an apparatus for coating wire incorporating features of this invention; and FIG. 1B is a continuation of FIG. 1A in a downward direction.

Referring now to the details of the invention as shown in FIGS. 1A and 1B of the drawings, the apparatus for carrying out the process comprises a primer treating suction 10 which is made of dielectric material such as a length of fiber glass tubing. A pair of spaced felt washers 12 are mounted in one end of the treating section 10, the space therebetween defining a primer coating chamber 14.

An induction heating coil 16 is positioned on the tubing of section 10 somewhat beyond the center, defining first a drying chamber 18, then a curing chamber 20. The latter chamber 20 is closed at the end by a felt washer 22.

Primer for the chamber 14 is circulated therethrough in a closed loop including a primer feed tank 24 and a pump 26. Air for the chambers 18 and 20 is provided by an air blower 28, the air for the latter chamber 20 being preheated before introduction by means of an air heater 30. A vent 32 near the primer coating chamber 14 exhausts the spent air from chambers 18 and 20.

The next-in-line unit of the apparatus is a coating section 40 comprising a disengaging hopper 42, a J-shaped coater-circulator 44, and a preheater and postheater 46 and 48 respectively. The coater recirculator 44, preheater 46 and postheater 48 are provided with induction coils 50 as shown and which may conveniently be in series connection. It is important to note that the two lowermost induction coils 50 must be would over elements 44 and 46 of dielectric tubing only. Postheater 48 will be discussed later in greater detail.

A short arm 43 of the J-shaped coater-recirculator 44 (with one section of coil 50) depends from the lowermost end of the hopper 42 and the preheater 46 (with another sector of coil 50) extends coaxially therebelow with a felt washer 52 closing the bottom end.

The lift or long arm 45 of the J-shaped recirculator 44 extends within the hopper 42 nearly to the top cover 41 thereof in a chamber 54. The remainder of the hopper 42 is occupied by another chamber 56, this one above and coextensive with the short arm 43 of the J. These two chambers 54 and 56 freely communicate at their bottom ends through an aperture 58 and thus close a recirculating system including the arms 43, 45 of J-shaped coater-recirculator 44 for coating powders introduced from time to time to hopper 42 through its cover 41.

An asbestos washer 53 separates the postheater 48 from the hopper 42 to essentially confine the recirculating system mentioned above.

The operation of recirculation is accomplished by air introduced at a valved inlet 60 at the bend of the J-shaped recirculator 44. This inlet 60 is bent or inclined in the desired direction of circulation as shown and receives air, cooled and dried by a cooler-dryer 62.

Another valved air inlet 64 is located near the bottom of the preheater 46 and still another inlet 66 extends coaxially upward into the lift or long arm 45. The latter inlet 66 is served by an air valve 68 attached to a control 70. This control 70 senses the air pressure above and below in the lift arm 45 and automatically maintains a differential of air pressure therebetween.

A valved restricted opening 72 is located close to the asbestos washer 53 to vent the spent air from the coater-recirculator 44.

The postheater 48, while energized by an induction coil 50, has a radiant heater element 74 in the form of a stainless steel tubing core. This element 74 extends upwardly beyond the coil 50 and is provided at this point with a valved air inlet 76. Still further upwardly it terminates as a re-entrant stub 78, within a quench tower 80.

A tee fitting 82 on the top end of the quench tower 80 is used to introduce cooling water thereinto. The top of the fitting 82 is provided with a felt washer 84.

A water overflow 86 extends from the tower 80 at a point somewhat below the top of the stub 78. An air vent 88 extends from the tower near its top. A control 90 senses air pressure at this air vent 88 and controls the air vent 72 below on the coater-recirculator 44 to maintain a positive air pressure differential between it and the quench tower 80.

Wire W to be coated is reeved through the apparatus in the order of description recited above using the felt and asbestos washers mentioned as ingress and egress seals. Idler sheaves 92 and 94 are used to change the direction of the wire W and adjustable centering blocks 96 and 98 to guide it accurately.

For coating 20 gauge steel wire with vinyl thermoplastic, the following procedure has been found satisfactory using a primer of thermosetting material in solvents and containing metal pigments higher in the electromotive series than iron.

Wire W which has been cleaned of scale and grease by solvents and pickling, or grit blasting is passed through a primer coating chamber 14 wherein the primer is in a continuous state of agitation to prevent settlement of the metal pigments by vigorous circulation through the coating chamber 14 and within the primer feed tank 24.

A film of primer including the solvents of about 0.5 to 1 mil thick is deposited on the wire W and any excess is removed when the wire passes through felt wipers 12. This corresponds to a cured film thickness of approximately 0.1 to 0.2 mils in the cured condition. The wire W then passes through a drying chamber 18 where it first contacts warm (about 120 to 140° F.) fresh air flowing in a countercurrent direction at velocities in the tunnel in the order of 20 to 30 f.p.s. The temperature in the tunnel gradually increases as the wire W progresses.

The main purpose of the air is to drive off solvents to permit curing but at such a rate that a skin does not form on the outer surface and thus entrap moisture which could cause bubbling of the coating. When the coating is essentially solvent-free, heat is induced in the wire by the induction heating coil 16 surrounding it. The purpose of supplying heat at this point is to cure the thermosetting material with the aid of additional hot air introduced at the wire outlet end of the tunnel.

Heat input in the curing chamber 20 can be controlled by a thermostat on the air heater 30 or by power input to the induction coil 16. Temperature of the wire leaving the curing tunnel is about 250° F. At this stage the primer coating has cured sufficiently to permit passage over the neoprene or other suitable material rimmed idler sheave 92 without removal of the primer in order to change direction from horizontal movement of the wire to vertical.

The small adjustable centering block 96 is next in line to insure centering of the wire W through the vertical coating section 40. The wire W next passes through a preheater section 46 where final curing of the primer takes place and a very thin deposit of powdered vinyl polymer is partially fused on the primer surface to permit chemical linkage between the two materials before the main coating thickness is applied. The thickness of the deposit of fusible powdered vinyl polymer fused on the surface is determined by the reaction variables prevailing on passage of the wire through section 46. As indicated below, these variables include the concentration of vinyl polymer powder and the fusing temperature.

Heat is again induced into the wire by the second induction coil 50 which is in series with the first coil 50 and the following. The wire W is sealed from the outside atmosphere at the bottom of the preheater section 46 with felt seals 52 and a measured quantity of air is introduced above the seal at inlet 64 in sufficient quantity to insure low concentrations of vinyl polymer powder in this zone, coming from the coater-circulator 44 above.

The superficial gas velocity in the preheater 46 is about 20 to 30 f.p.s. and the wire W is brought to temperatures in the order of 500° to 650° F. depending mainly on desired coating thickness. The gauge of the wire W also has an effect on the temperature reached in the preheater 46.

From the preheater 46, the wire passes into the coater-circulator 44. Once again the heat is applied to the wire W by another induction coil 50, mainly to compensate for heat of fusion of the plastic and heat losses to the surrounding powder. In this section, unaerated powder is moving in a countercurrent direction to the movement of the wire W.

The movement of the powder is important at this point so that it will continuously fill in voids created by the melting of the powder on the surface of the W, but equally important is the fact that the powder is in a highly compacted state in an unaerated condition.

Compacting of the powder at this state is aided by the use of air or electrically operated vibrators 100 attached to the equipment. The avoidance of air entrapped in the powder eliminates voids in the coating during fusion of the powder and thus prevents any possibility of pinholes in the outer coating of the wire W.

Circulation of powder is established by aerating the powder in a lift arm 45 which is parallel to the coating section arm 43. At this point, the powder which has been through the coater 44 is cooled either by lifting the powder with cooled air or by heat exchange with a cooling medium circulating in external tubes not shown.

During the coating operation, part of the circulating powder immediately adjacent to the fuses surface picks up heat due to conduction. Unless the powder is continuously cooled there is a tendency for it to form small, partially fused spheres which would ultimately result in nonuniform coatings.

It should be noted that air which is introduced into the preheater 46 does not enter the short arm 43 but passes up through the lift or long arm 45 since the differential pressure across the lift arm is lower than that in the coating section short arm due to the difference in densities of the powder.

From the lift arm 45, the powder and air mixture enters the disengaging hopper 42 to separate the two materials. The air travels in a horizontal path and makes two passes the full length of the hopper to attain a high separation efficiency. This is accomplished by a baffle 51 which divides the hopper into two sections 54, 56 except at the bottom aperture 58 which permits the separated powder to return to the short arm 43 of coating section 40. Air in hopper 42 is prevented from passing through coater 43 by the compacted mass of coating material therein.

Just before the air leaves the disengaging hopper 42, the velocity is appreciably increased by restricted opening 72. This opening 72 is located close to the wire outlet from the hopper and the high velocity at this point blows off any unfused powder which may be loosely held to the fused surface prior to entry into the postheating section.

Even though the wire at this stage contains residual heat, the rate of heat transfer to the outer surface of the coating is relatively slow due to the fact that the plastic material is a poor heat conductor. Therefore, further heat is applied in a postheating section 48 but in this case the heat source is external to the wire.

Once again, induction heat is used in order to retain continuity of operation with movement of the wire but in this instance a stainless steel sleeve 74 surrounding the wire is heated by the induction coil 50 which in turn, supplies a source of radiant heat to the outside coated surface.

The relative heat inputs to the four heating coils operating in series is approximately 25 percent in the curing coil, 35 percent in the preheating coil, 20 percent in the coating coil, and 20 percent in the postheating coil.

After postheating, the coating is first air quenched at 76 and then water quenched at 80, before passing over the return idler sheave 94. Once again, at the outlet of the water quench section 80, a centering block 98 is installed which is adjustable to center the wire through the vertical passage.

For coating 10 gauge steel wire with polyolefin thermoplastics, such as polyethylene or polypropylene containing metal, metal oxides, metal hydroxides, metal carboxyl groups, which will promote cross-linking reactions under the heat conditions for coating and including heat and UV stabilizers as well as pigments are used. A different primer is here used. This primer is a weak acid solution of a base metal higher in electromotive series than iron.

The wire follows the same general steps as in the previous example but there are some differences, as will now be discussed. In the curing tunnel, the weak acid primer is dried on the surface of the wire W and again the thickness of coating is about 0.1 to 0.2 mils. The temperature of the wire W leaving the curing section is about 200 to 230° F. The temperature in the preheating section is approximately 100° F. lower than in the previous example.

In this section and in the coating section, cross-linking reactions occur which form molecular bonds between the surface of the metal of the wire W and the metal additives which have been previously mixed into the powdered polyolefin material. These reactions upgrade the physical and chemical properties of the coating as compared with a virgin polyolefin material, such as much higher temperature properties, high tensile strengths, greater chemical resistance to corrosive atmospheres, improved weathering properties, greater abrasion resistance, and the like. Again the procedure of coating by this technique offers considerable advantages in temperature control and uniformity of temperature which is extremely important when cross-linking reactions take place. One can also appreciate that the continuous cooling of power is an essential requirement.

The technique for coating the same wire as in the previous example with thermosetting material such as epoxy-polyamide prepared by partial (B-stage) curing to a solid state and then pulverizing with pigments and stabilizers is as now described.

The primer is a phosphate treatment (Bonderizing). The phosphate treatment of the wire is similar to the weak acid treatment described above. In the coating and postheating sections, however, the throughput rate is slowed down because of the curing times involved during the coating process. Curing temperatures are in the order of 500° to 650° F. Normally, if high temperature fast cures are employed these is a tendency to produce brittle type coatings which would have relatively poor impact properties for wire coatings.

Although the examples described herein are for the coating of steel wire, the process is not restricted to the use of steel. Essentially, any metal wire may be coated in the process although the efficiency of the induction heating unit will be different for other metals. For instance, in the case of copper, the efficiency of heating by this technique may be impractical in which case, other types of heating systems may be used such as radiant heating, convection heating, resistance heating, or combinations of these.

The same techniques of coating would be applied, however. Likewise, metals in other forms than wire W, such as flat coil, tubing, and the like may be coated in similar equipment. In addition, the coating of metals with pulverulent materials in an unaerated, compacted state, wherein the powder is maintained in a circulating condition by the use of an air lift, vacuum lift, mechanical lift, such as a screw conveyor or similar powder lifting device is of extreme importance in obtaining nonporous coatings particularly when coating at relatively fast rates. This same technique may be applied in systems other than the one described herein, even in noncontinuous dipping type operations by preheating of the metal part prior to immersion of the compacted moving powder stream. Other means of separating the air and powder mixture from the lift leg may be employed such as a cyclone separator, dust filter, and the like.

Obviously, many other modifications and variations of the present invention are possible in light of the above teachings. It is, therefore, to be understood that within the scope of the appended claims the invention may be practiced otherwise than as specifically described.

What is claimed is:

1. A process for coating metallic wire with plastic, comprising the steps of:
   a. primer coating the wire with a primer subject to heat curing;
   b. internally heating the wire after application of the primer coating but before curing is completed, simultaneously exposing the primer coated wire to air having fusible plastic powder therein, thereby simultaneously heat-curing the primer and fusing a relatively thin layer of said fusible plastic powder thereon;
   c. further internally heating the wire, simultaneously fusing additional of said fusible plastic power to the wire in a layer thick relative to the first said layer by continuously passing the coated wire through a cooled mass of said fusible plastic powder which is compacted so densely that the mass is in an unaerated condition.

2. The process of claim 1 wherein the primer of said primer coating is thermosetting material and said fusible plastic powder is vinyl polymer.

3. The process of claim 1 wherein the primer of said primer coating is a weak acid solution of a base metal higher in the electromotive series than iron and said fusible plastic powder is polyolefin.

4. The process of claim 3 wherein said polyolefin contains a cross-linking agent for cross-linking with the surface of said metallic wire during said fusing.

5. The process of claim 3 wherein said polyolefin contains powdered metal.

6. The process of claim 1 wherein steps in the process are carried out in the sequence recited in said process continuously, with substantial quantities of the fusible plastic powder being continuously removed from one edge of the compacted, unaerated mass adjacent and passing coated wire, aerated in an area spaced from said passing coated wire, returned to another edge of the compacted, unaerated mass adjacent said passing coated wire, and recompacted.

7. A process for coating an article with plastic material, comprising:
   a. priming the article with a heat curable primer;
   b. internally heating the primed article while simultaneously exposing the article to air having therein fusible plastic powder, thereby through the heating simultaneously curing the primer and fusing a relatively small quantity of fusible plastic powder onto the primed article;
   c. further internally heating the and simultaneously fusing thereon a much greater quantity of fusible plastic powder relative to the first said quantity by continuously passing the article through a cooled, compacted, unaerated mass of said fusible plastic powder.

* * * * *